UNITED STATES PATENT OFFICE.

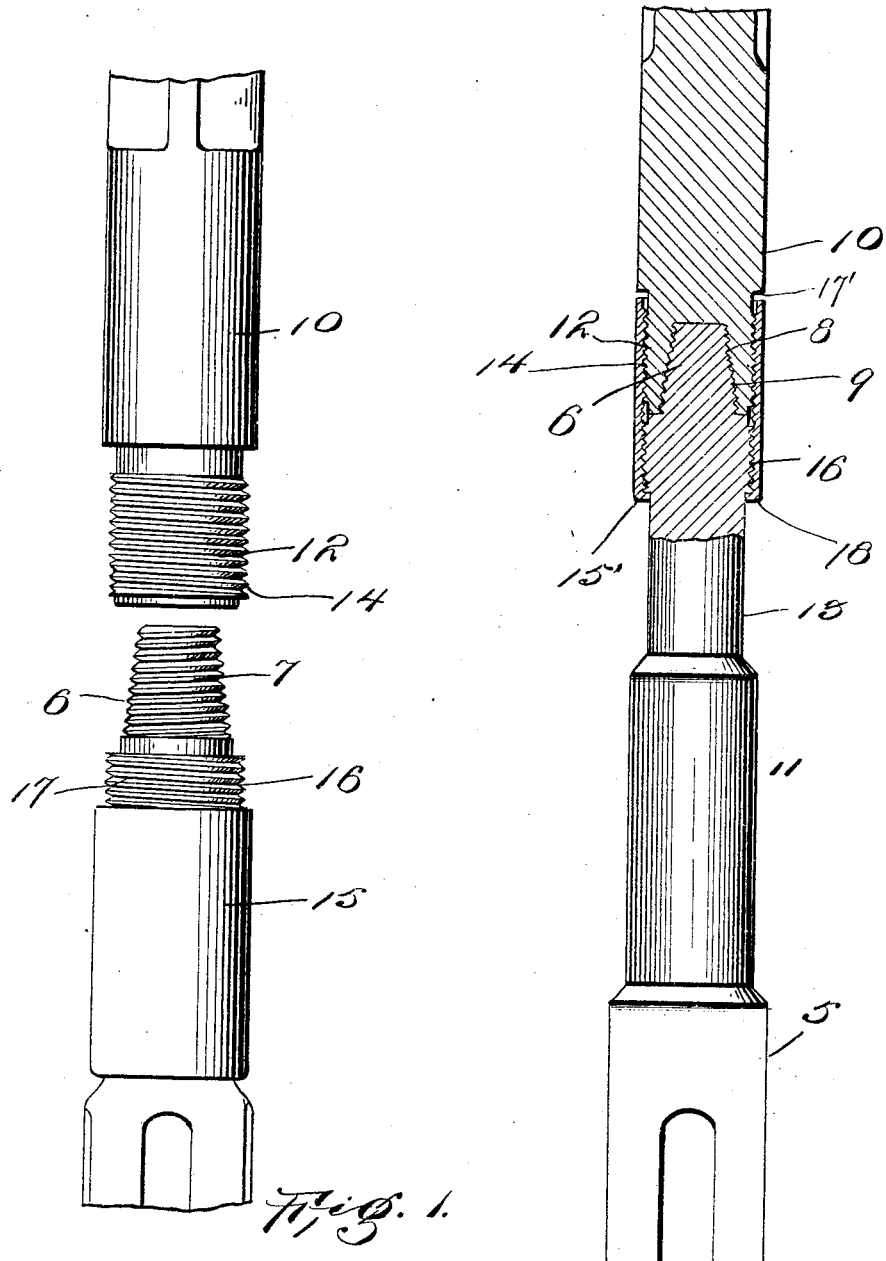

STEPHEN A. AKINS, OF CHANUTE, KANSAS.

COUPLING.

No. 805,402.

Specification of Letters Patent.

Patented Nov. 21, 1905.

Application filed April 13, 1904. Serial No. 203,046.

*To all whom it may concern:*

Be it known that I, STEPHEN A. AKINS, a citizen of the United States, residing at Chanute, in the county of Neosho, State of Kansas, have invented certain new and useful Improvements in Couplings; and I do hereby declare the following to be a full, clear, and exact description of the invention, such as will enable others skilled in the art to which it appertains to make and use the same.

This invention relates to couplings or lock-joints for drills; and it has for its object to provide a construction wherein the bit will be held securely to the drill-rod under working conditions and may be easily and quickly removed when desired, other objects and advantages of the invention being understood from the following description.

In the drawings forming a portion of this specification, and in which like numerals of reference indicate similar parts in the several views, Figure 1 is an elevation showing a drill and a portion of a drill-rod embodying the present invention. Fig. 2 is a central longitudinal section through the construction illustrated in Fig. 1.

Referring now to the drawings, there is shown a drill-bit 5, comprising the usual blade, from which projects a stem for connection with the drill-rod. The free end of the stem is reduced in diameter and is frusto-conical in shape, as shown at 6, and is provided with a right-hand thread 7, which engages the threads 8 of the frusto-conical socket 9 in the end of the drill-rod 10.

Between the portion 6 of the drill-bit and what may be called the "body" 11 thereof there are two cylindrical portions 12 and 13, the portion 12 being of somewhat greater diameter than the base of the frusto-conical portion 6 and having left-hand peripheral threads 14. The portion 13 is of a diameter slightly less than that of the portion 12 at the base of the threads, so that a sleeve or nut 15 may be engaged with the threads 14 and screwed thereover and beyond the portion 12 to lie upon the portion 13. The portion 13, if desired, may be only of such length as to permit the nut or sleeve to be adjusted with its outer end face flush with the outer end face of the portion 12.

The free end portion of the drill-rod is reduced in exterior diameter, as shown at 16, and is provided with a peripheral left-hand thread 17 to receive the nut or sleeve 15, the lengths of the portions 16 and 12 being equal to the length of the nut or sleeve, so that when the stem 6 is engaged in the socket of the drill-rod the nut or sleeve may lie in engagement with the portions 12 and 16, flush with the drill-rod and against the shoulder 18 at the base of the portion 16. There are thus presented no places for lodgment of dirt, and there are no projections to interfere with operation of the drill in the usual manner. Any tendency of the stem of the bit to unscrew from the socket of the drill-rod will serve to engage the nut or sleeve more securely with the parts, so that when the bit is to be removed from the rod the nut or sleeve must be first backed off from the portion 16. To manipulate the sleeve or nut, a spanner-wrench may be provided.

While the coupling is illustrated as applied to the drill-bit, it will of course be understood that it may be employed at other points where it is usual to employ couplings and that the use of the coupling is not limited to drill-bits or drill-jars.

It will be noted that the sleeve 15 has an inwardly-directed flange 15' at its inner end, which closely encircles the portion 13, and this flange by striking against the inner end of the portion 12 prevents disengagement of the sleeve from the threads 14.

When the portion 6 is screwed into the socket 9 and the sleeve is screwed over the portion 16, so that the flange 15' strikes against the shoulder at the inner end of the portion 12, the outer end of the sleeve is spaced a slight distance from the shoulder 17' at the inner end of the portion 16. This permits of tightening of the sleeve to jam the threads and hold the parts securely against disengagement.

It will be understood that in practice modifications of the specific construction shown may be made and any suitable materials and proportions may be used for the various parts without departing from the spirit of the invention.

What is claimed is—

In a coupling, the combination with a member having a frusto-conical threaded stem, a cylindrical portion at the base of the stem, having threads disposed reversely to those of the stem, and an unthreaded cylindrical portion in the rear of the last-named cylindrical portion, of a diameter less than that of said last-named cylindrical portion, of a second member having a frusto-conical end socket threaded for engagement of the threads of the frusto-conical stem and having a reduced free end provided with threads corresponding to those of the threaded cylindrical portion of the first member, and a sleeve engaged with the cylindrical threaded portions of the members and movable from the threaded portion of the second member to surround the threaded and unthreaded cylindrical portions of the first member, the inner end of the sleeve having an inwardly-turned flange for engagement with the unthreaded portion immediately beneath the second-mentioned screw-threaded portion of the first-mentioned member.

In testimony whereof I affix my signature in presence of two witnesses.

STEPHEN A. AKINS.

Witnesses:
ALBERT F. HAND,
A. S. ROSIER.